A. PAPP & J. CHRISTOF.
COAL CAR.
APPLICATION FILED JAN. 29, 1917.

1,224,094.

Patented Apr. 24, 1917.

Witnesses
Chas. W. Stauffiger
Karl H. Butler

Inventors
Andy Papp,
James Christof,
By
Barthel & Barthel
Attorneys

UNITED STATES PATENT OFFICE.

ANDY PAPP AND JAMES CHRISTOF, OF DETROIT, MICHIGAN.

COAL-CAR.

1,224,094. Specification of Letters Patent. Patented Apr. 24, 1917.

Application filed January 29, 1917. Serial No. 145,207.

*To all whom it may concern:*

Be it known that we, ANDY PAPP and JAMES CHRISTOF, subjects of the King of Hungary, residing at Detroit, in the county of Wayne and State of Michigan, have invented certain new and useful Improvements in Coal-Cars, of which the following is a specification, reference being had therein to the accompanying drawings.

This invention relates to coal cars and has special reference to propulsion means to facilitate moving the car, particularly when empty.

Our invention aims to furnish a coal car with a powerful spring motor that may be placed in condition for use at a predetermined time and the energy of the spring motor reserved until it is desired to utilize the motor as propulsion means for the car, either by itself or in conjunction with some other means of moving a car.

Figure 1:
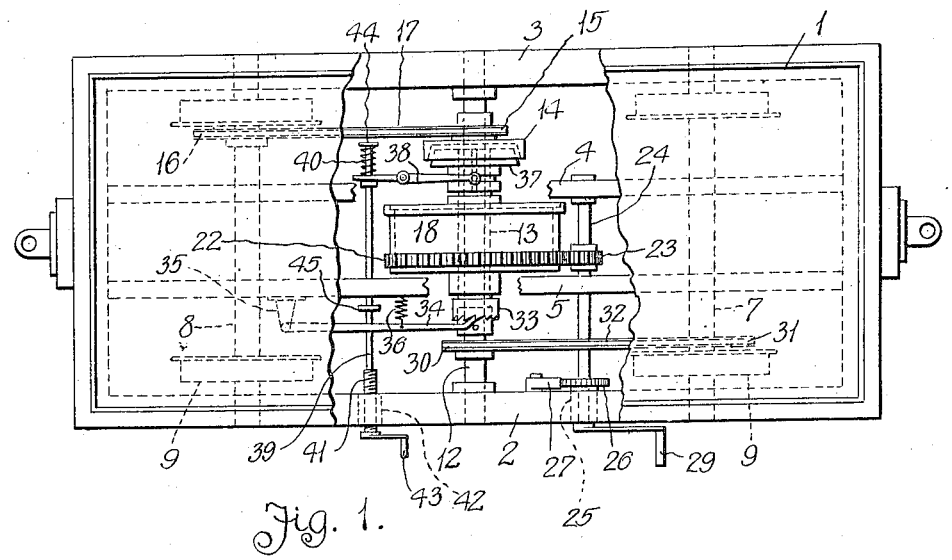
Figure 2:
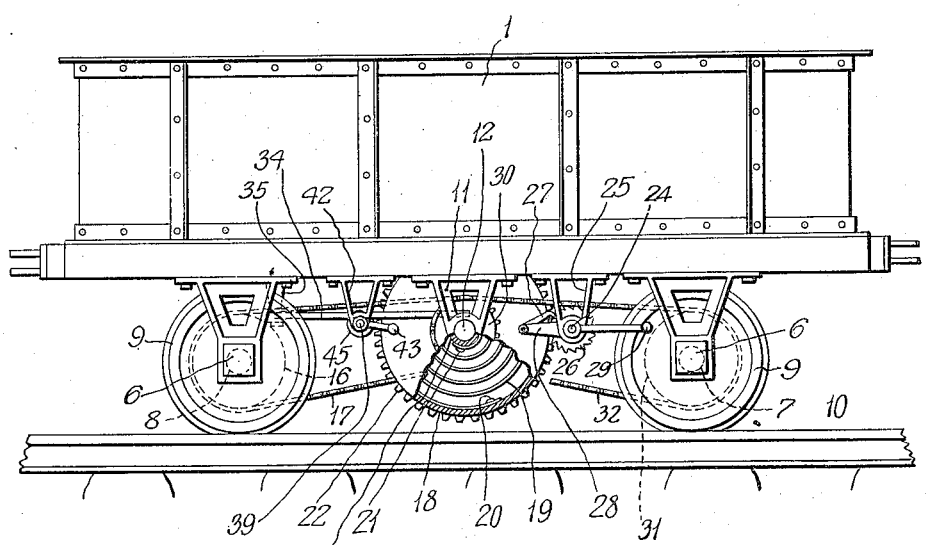

Our invention will be hereinafter specifically described, and then claimed, and reference will be had to the drawings, wherein Figure 1 is a plan of the car partly broken away to show the motor in plan, and Fig. 2 is a side elevation of the car with the motor partly broken away and partly in section.

In the drawing, 1 denotes a car body having side sills 2 and 3 and longitudinal center girders 4 and 5. The car body has the usual journal boxes 6 for revoluble axles 7 and 8 having wheels 9 so that the car may be moved on a track 10.

The side sills 2 and 3 are provided with hangers 11 for a revoluble shaft 12, and loose on said shaft is a sleeve 13 having one end thereof provided with a friction clutch member 14 and a sprocket wheel 15. This sprocket wheel longitudinally alines with a similar wheel 16 on the axle 8 and trained over the sprocket wheels 15 and 16 is an endless sprocket chain 17. Loose upon the sleeve 13 is a motor drum 18 containing a powerful spiral band spring 19 with one end of the spring connected to the inner annular wall of the drum 18, as at 20 and the opposite end of the spring connected to the sleeve 13, as at 21. The motor drum 18 has a peripheral rack 22 and meshing therewith is a pinion 23 on a shaft 24, journaled in hangers 25, carried by the side sill 2 and the girders 4 and 5. The shaft 24, adjacent the hanger of the side sill 2, has a ratchet wheel 26, and normally engaging said ratchet wheel to prevent a counterclockwise rotation of the shaft 24 is a pawl 27 carried by an extension 28 of the hanger 25 of the side sill 2. A crank 29 is placed on the end of the shaft 24 so that the spring 19 may be manually placed under compression, or a suitable source of power may be connected to the shaft to accomplish the same result.

The shaft 12 is provided with a sprocket wheel 30 longitudinally alining with a similar wheel 31 on the axle 7, and trained over the sprocket wheels 30 and 31 is an endless sprocket chain 32.

One end of the sleeve 13 has a ratchet head 33 and engaging said head is a long pawl 34 pivotally supported by a bracket 35 carried by the girder 5. The long pawl 34 is connected to the girder 5 by a coiled retractile spring 36 and this spring holds the long pawl normally in engagement with the ratchet head 33 to prevent an unwinding rotation of the sleeve 13 until it is desired to use the motor.

On the opposite end of the sleeve 13 there is slidably keyed a clutch member 37 adapted to engage the clutch member 14 and establish rotative continuity between the sleeve 13 and the shaft 12. The clutch member 37 is controlled by a fulcrum lever 38 that may be supported by the sill 4 and adapted to shift the lever 38 is a rod 39 and a coiled spring 40 on the end of said rod. The rod 39 has a threaded portion 41 in engagement with a hanger 42 carried by the side sill 2 and on the outer end of said rod is a crank 43 to facilitate rotating the rod. The inner end of the rod 39 has a head 44 and the spring 40 encircles the rod 39 between said head and the end of the lever 38. The rod 39 is also provided with a cross head or side extension 45 adapted to engage the long pawl 34 and shift said pawl out of engagement with the ratchet head 33.

When a coal car is provided with a spring motor, it is preferable to place the motor in operative condition when the car is out of a mine for instance, at a coal tipple. Power may then be applied to the winding shaft 24 or the crank 29 may be manually manipulated. When the shaft 24 is rotated clockwise, the pawl 27 recedes over the ratchet wheel 26, and a rotary movement is imparted to the motor drum 18 and the spring 19 wound up and placed under compression.

It is held in this condition by the long pawl 34 engaging the ratchet head 33 and the pawl 27 engaging the ratchet wheel 26.

To utilize the expansive force of the spring 19 and transmit such power to the axles 7 and 8, the rod 39 is adjusted. By turning the crank 33, the rod 39 is reciprocated or shifted transversely of the car. As the rod 39 is moved outwardly, the spring 40 shifts the fulcrum lever 38, thereby placing the clutch member 37 in engagement with the clutch member 48 and coupling the sleeve 13 and the shaft 12 for movement in synchronism. Further upward movement of the rod 39 causes the cross head or side extension 45 thereof to impinge against the long pawl 34 and as said pawl is shifted out of engagement with the ratchet head 33, the sleeve 13 and the shaft 12 is then free to be revolved by the expansive force of the spring 19. The movement imparted to the shaft 12 and the sleeve 13 is transmitted to the axles 7 and 8 through the medium of the sprocket chains 17 and 32 associated with the sprocket wheels 31 and 16 on the axles 7 and 8 respectively.

Using a very powerful spring in the motor drum the car can be moved, particularly when empty, by the spring motor, and in a great many instances, the use of the spring motor will be reserved for emergency cases, especially for moving the car when it cannot be moved by hand.

What we claim is:—

1. The combination with a car body and revoluble axles and wheels, of sets of hangers carried by said car body, a motor shaft journaled in one set of hangers, a sleeve loose on said shaft, a drum loose on said sleeve, a spiral spring in said drum having one end thereof attached to said sleeve and the other end thereof attached to said drum, a clutch member on said shaft, a shiftable clutch member on said sleeve and held to rotate therewith, sprocket chains adapted to impart movement from said motor shaft and sleeve to said axles, a ratchet head carried by said sleeve, a lever adapted to move said shiftable clutch, a pawl normally engaging said ratchet head to prevent operation of said sleeve by said spring, means carried by another set of hangers adapted to successively move said lever and pawl so that said shiftable sleeve clutch is moved to engage the shaft clutch to establish a driving connection therebetween, and said sleeve released for operation by said spring, and means carried by another set of hangers adapted for rotating said drum to place the spring therein under tension.

2. The combination with a car body having revoluble axles and wheels, of a motor shaft supported beneath said car body, a sleeve loose on said shaft, a spring actuated motor for imparting movement to said sleeve, driving connections between said shaft and said axles, a clutch on said shaft, a shiftable clutch slidably keyed on said sleeve and adapted to engage said shaft clutch, a lever adapted to shift said sleeve clutch to establish a driving connection between said sleeve and shaft, a ratchet head carried by said sleeve, a pawl normally engaging said ratchet head to prevent operation of said sleeve by said spring actuated motor, means carried by said car body adapted to successively move said lever and said pawl to establish a driving connection between said sleeve and said shaft and release said sleeve for operation by said spring actuated motor, and means including a rack and pinion adapted for placing said spring actuated motor in an operable condition for imparting movement to said sleeve.

In testimony whereof we affix our signatures in presence of two witnesses.

ANDY PAPP.
JAMES CHRISTOF.

Witnesses:
 KARL H. BUTLER,
 GEORGE STALINKO.

Copies of this patent may be obtained for five cents each, by addressing the "Commissioner of Patents, Washington, D. C."